N. P. NEAL & W. N. STROUD.
Agricultural Implement.
No. 222,151.              Patented Dec. 2, 1879.
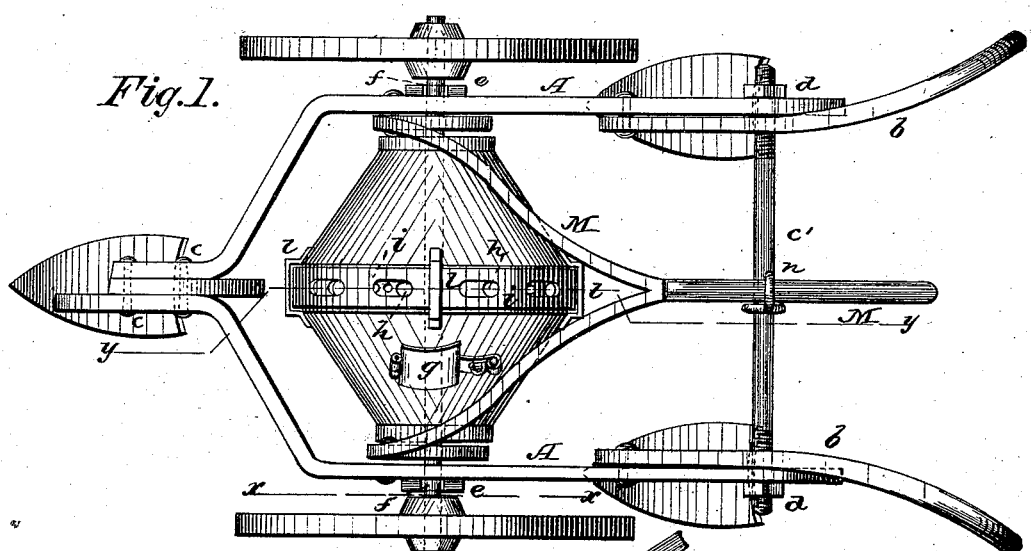
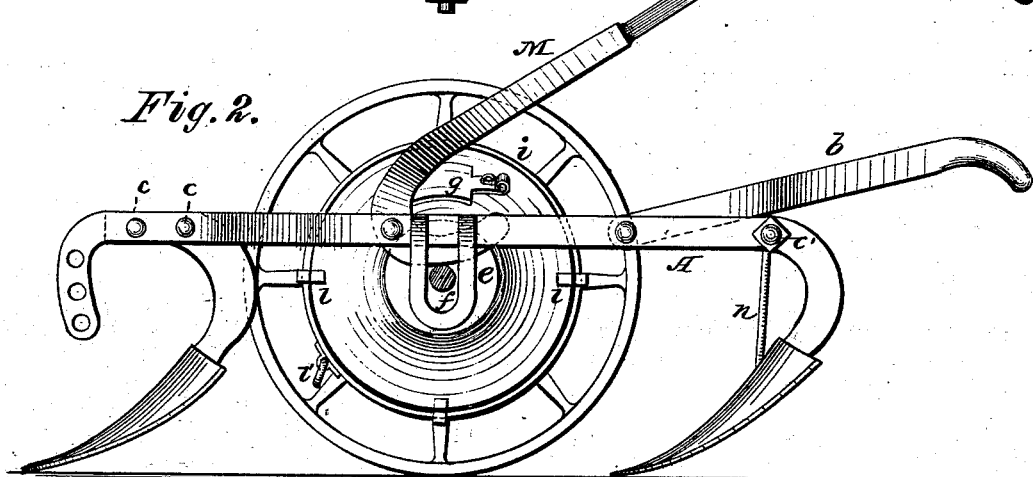
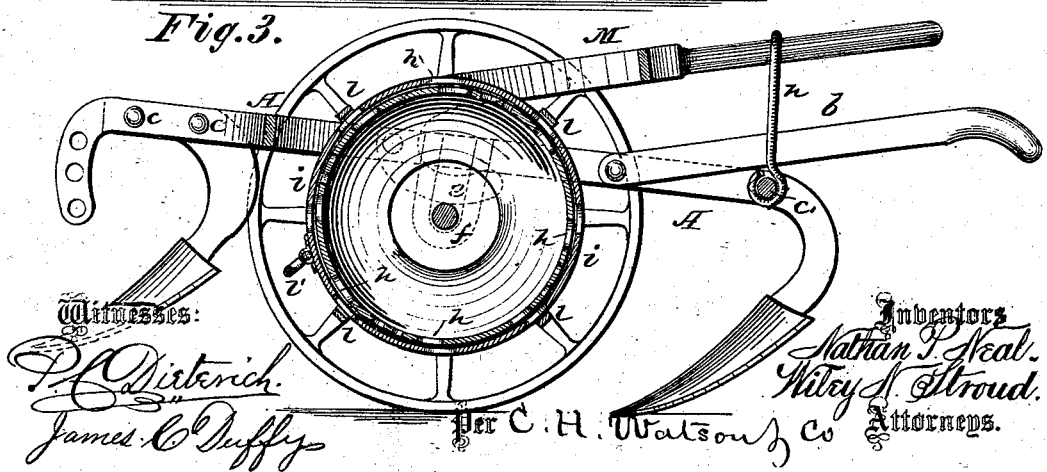

UNITED STATES PATENT OFFICE.

NATHAN P. NEAL AND WILEY N. STROUD, OF WAXAHACHIE, TEXAS.

IMPROVEMENT IN AGRICULTURAL IMPLEMENTS.

Specification forming part of Letters Patent No. 222,151, dated December 2, 1879; application filed May 1, 1879.

*To all whom it may concern:*

Be it known that we, NATHAN P. NEAL and WILEY N. STROUD, of Waxahachie, in the county of Ellis and State of Texas, have invented certain new and useful Improvements in Agricultural Implements; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of this invention consists in certain improvements in a combined corn and cotton-seed planter, as hereinafter described, and pointed out in the claim.

In the drawings, Figure 1 is a top or plan view of a seed-planter embodying our improvements. Fig. 2 is a section taken on a vertical plane indicated by line $x\ x$, Fig. 1, and Fig. 3 a similar section taken on line $y\ y$, of the same figures.

Referring by letter to the above figures, A represents a sulky-frame, which carries the handles $b$, and which serves the purpose of a forward or front and right and left side plow-beams. This frame, which is composed of two parts, is held together at the front by bolts $c$, and at the rear by a rod, $c'$, the said rod being screw-threaded and provided with nuts $d$ arranged upon both sides of the two parts of the frame through which it passes. By adjusting these nuts upon the rod $c'$ the side beams can be set at variable distances apart, so as to adapt the device to different kinds of planting. As an auxiliary to such adjustment we secure to the side beams of the frame A U-shaped irons $e\ e$, one upon the outside of each beam. The axle $f$ passes through these irons, and hence while it will be kept properly in place the beams will be left free for lateral adjustment.

Upon the axle and between the frame is secured a peculiar-shaped drum, which rotates with the axle. The conformation of this drum approximates to two cones placed base to base, as shown. This drum is provided with an opening upon one of its sides for the supply of corn or seed, and a suitable door, $g$, for closing up the same.

The drum has a series of oblong openings, $h$, through which the seed are fed out during the revolutions of the drum, and from the shape of the drum it is evident that the seed will pass out through the discharge-openings freely and until the entire quantity has been exhausted.

Upon the outside of the drum is arranged a band, $i$, formed with openings corresponding to the discharge-openings in the drum. This band is adapted to slide round upon the drum, and is held thereon by loops $l$. It is also provided with one or more rings or handles, $l'$, whereby it may be readily moved or shifted so as to bring its openings directly over the openings in the drum, or partially over the same for the purpose of regulating the discharge of seed, or entirely away from the same, so as to altogether close up the drum. In regulating the discharge-apertures large openings will be suited to cotton-seed planting and smaller ones for corn.

As usual in planting devices for seed, the wheel upon one side and the axle rotate together by means of a rigid attachment. The remaining wheel rotates loosely upon the axle.

M is a bifurcated lever pivoted to the side beams of the frame, and provided with curved ends which, when the handle thereof is elevated, act upon the axle, and hence raise or lower the plows according to the elevation of the said handle. This lever, when desired, is held down and away from the axle by a hook, $n$.

Having thus described a combined corn and cotton-seed planter embodying our improvement, what we claim, and desire to secure by Letters Patent, is—

The combination of the U-shaped irons $e\ e$, secured to the side beams of the frame, with the bifurcated lever M, axle $f$, and seeding-drum, substantially as and for the purpose herein set forth.

In testimony that we claim the foregoing as our own we have hereto affixed our signatures in presence of two witnesses.

NATHAN P. NEAL.
WILEY N. STROUD.

Witnesses:
JAS. E. SMITH,
H. H. RAWLINGS.